(12) United States Patent
Persson et al.

(10) Patent No.: US 8,191,507 B2
(45) Date of Patent: Jun. 5, 2012

(54) AUTOMATIC MONITORING OF MILKING PLANT VALVE MEANS

(75) Inventors: Staffan Persson, Tumba (SE); Magnus Lidman, Röninge (SE)

(73) Assignee: DeLaval Holding AB, Tumba (SE)

( * ) Notice: Subject to any disclaimer, the term of this patent is extended or adjusted under 35 U.S.C. 154(b) by 323 days.

(21) Appl. No.: 12/449,322

(22) PCT Filed: Oct. 29, 2007

(86) PCT No.: PCT/EP2007/061620
§ 371 (c)(1),
(2), (4) Date: Dec. 1, 2009

(87) PCT Pub. No.: WO2008/095552
PCT Pub. Date: Aug. 14, 2008

(65) Prior Publication Data
US 2010/0154715 A1    Jun. 24, 2010

(30) Foreign Application Priority Data
Feb. 5, 2007 (SE) ........................ 0700274

(51) Int. Cl.
*A01J 5/00* (2006.01)
(52) U.S. Cl. ............... 119/14.18; 119/14.02; 119/14.08; 119/14.14
(58) Field of Classification Search ........ 119/14.02, 119/14.08, 14.14, 14.18, 14.46; 73/40.5 R
See application file for complete search history.

(56) References Cited

U.S. PATENT DOCUMENTS

| | | | |
|---|---|---|---|
| 3,835,878 A | 9/1974 | Braidt et al. | |
| 4,205,702 A | 6/1980 | Silverwater et al. | |
| 5,046,519 A * | 9/1991 | Stenstrom et al. | 137/1 |
| 5,540,083 A * | 7/1996 | Sato et al. | 73/40 |
| 6,089,242 A * | 7/2000 | Buck | 134/57 R |
| 6,308,655 B1 * | 10/2001 | Oosterling | 119/14.08 |
| 6,852,172 B1 | 2/2005 | Lidman | |
| 7,036,981 B2 * | 5/2006 | Veenstra et al. | 374/142 |
| 7,313,497 B2 | 12/2007 | Breen et al. | |
| 2004/0107767 A1 | 6/2004 | Johnson et al. | |
| 2006/0111875 A1 | 5/2006 | Breen et al. | |

FOREIGN PATENT DOCUMENTS
AT    250106    10/1966
(Continued)

OTHER PUBLICATIONS

PCT International Preliminary Report on Patentability for PCT/EP2007/061620, May 18, 2009.

*Primary Examiner* — Rob Swiatek
*Assistant Examiner* — Danielle Clerkley
(74) *Attorney, Agent, or Firm* — Young & Thompson

(57) ABSTRACT

The invention relates to a solution for cleaning a milking plant, which includes a milk line system (MLS), connectable to a collecting means, and is adapted to deliver milk that has been withdrawn from animals to a milk storage means (250). The milking plant also includes milk storage valve means (100; 235, 240), arranged between the milk line system (MLS) and the milk storage means (250). The valve means (240) are selectively adjustable to prevent fluid communication between the milk line system (MLS) and the milk storage means (250) during cleaning of the milk line system (MLS). Moreover, the valve means (100; 235, 240) are associated with a monitoring arrangement (275, EPS), which is adapted to determine an amount of leakage through the valve means (100; 235, 240) during the cleaning of the milk line system (MLS), and produce a valve health status signal (Sv) reflecting the amount of leakage. Hence, the functionality status of the valve means (100; 235, 240) may be qualitatively evaluated.

40 Claims, 6 Drawing Sheets

FOREIGN PATENT DOCUMENTS

| | | |
|---|---|---|
| DE | 30 00 801 A1 | 7/1981 |
| DE | 38 19 300 C1 | 12/1989 |
| EP | 1 466 521 A2 | 10/2004 |
| WO | WO 01/19173 | 3/2001 |
| WO | WO 0119175 | 3/2001 |
| WO | WO 2004088190 | 10/2004 |

* cited by examiner

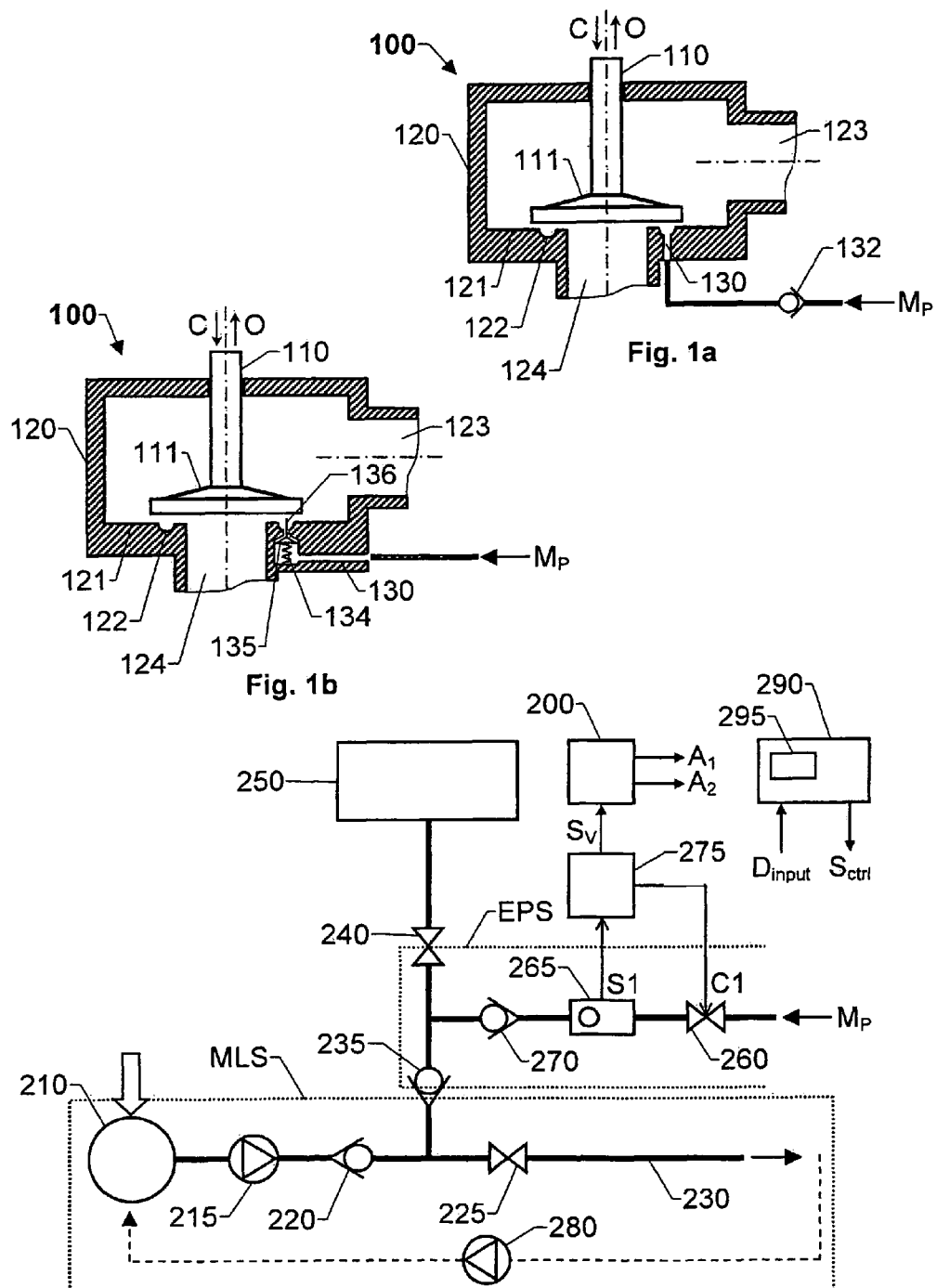

AUTOMATIC MONITORING OF MILKING PLANT VALVE MEANS

THE BACKGROUND OF THE INVENTION AND PRIOR ART

The present invention relates generally to machine milking of animals. More particularly the invention relates to a milking plant for milking animals according to the preamble of claim 1 and a cleaning method for a milking plant according to the preamble of claim 13. The invention also relates to a computer program according to claim 20 and a computer readable medium according to claim 21.

Automatic milking solutions are becoming increasingly efficient and sophisticated. Today, there is also a strong demand for flexible and animal-friendly milk production. For example, so-called milking robots have been introduced, which enable animals to autonomously decide when they are to be milked. In similarity with other types of milking plants, also these machines require cleaning to maintain a satisfying hygiene standard and to meet various regulatory requirements. Since, in contrast to traditional milking plants, the milking robots may be operated essentially at any time during the day, there are no natural specific occasions when it is appropriate to clean the milk line system of a milking robot. Moreover, taking the milking robot out of operation to manually clean its milk line system is a highly inefficient strategy. Instead, an entirely automatic cleaning procedure is desired. This approach is also advantageous from an animal-health point-of-view. Namely, one or more animals using the milking robot may undergo medical treatment, and therefore their milk cannot be mixed with the milk from the healthy animals. Based on the respective animal's identity, a computer system associated with the milking robot automatically directs any extracted milk that for various reasons is unusable (e.g. because it may contain antibiotics, or other undesired constituents) to a dedicated container. Additionally, subsequent to completion of extracting the unusable milk, the computer system orders cleaning of the milking robot's milk line system. In connection therewith the computer system must verify that relevant valves attain desired positions.

Furthermore, it is generally desirable that the milk line system is cleaned properly, the cleaning is completed rapidly without using excessive amounts of cleaning fluids. Today, pockets and drained pipe sections that are not included in the regular cleaning in place (CIP) procedure represent obstacles to accomplishing an efficient cleaning.

Therefore, a single boundary valve between the pipes of the milk line system under cleaning and the milk containing pipes is sought-after. At the same time, no cleaning liquids may enter into the milk, and thus contaminate the milk. However, a very limited leakage of milk into the system may be tolerated under cleaning. Naturally, any significant leakage in this direction will jeopardize the cleaning, or at least render the cleaning less efficient. Consequently, milk leakage into the cleaning fluid must be monitored.

To guarantee a satisfying operation, the milking plant and the valve means thereof are regularly subjected to maintenance and service. Naturally, for cost efficiency, it is desirable to avoid any unnecessary maintenance measures, and instead only repair any valves that actually require restoration.

U.S. Pat. No. 6,852,172 describes a solution for a milking plant wherein the milk line system from each milk collecting means can be shut off from the milk tank during cleaning of the milk line system. Potential leakage of detergent from the cleaning fluid to the milk in the milk tank is here prevented by providing a pressure difference between the two fluids, i.e. the milk and the cleaning fluid. Preferably, the pressure difference is achieved by connecting the cleaning fluid to the vacuum supply of the milking plant, while the milk side remains at atmospheric pressure. The tightness requirements on the shut-off valve can be relaxed, since although milk may leak into the milk line system, no cleaning fluid may leak into the milk tank.

Hence a prior-art solution is known, which is capable of separating cleaning fluid from milk. However, the problem of designing a milking plant, which on one hand allows failsafe and efficient cleaning of the milk line system while other parts of the milking plant contains milk; and on the other hand provides a quality indication for the valve means that separates the cleaning fluid from the milk during the cleaning process remains to be solved.

SUMMARY OF THE INVENTION

The object of the present invention is therefore to solve the problem above and thus offer a straightforward, overall efficient and reliable means to accomplish internal cleaning of a milking machine.

According to one aspect of the invention, the object is achieved by the initially described milking plant, wherein the valve means are associated with a monitoring arrangement. This arrangement, in turn, is adapted to determine an amount of leakage through the valve means during the cleaning of the milk line system. Moreover, the monitoring arrangement is adapted to produce a valve health status signal reflecting the amount of leakage.

The milking plant is advantageous because it enables a balanced evaluation of the valve means functionality status, so that for example a relatively low degree of leakage may result in a mild action, e.g. triggering an alarm, while a relatively high degree of leakage may result in a more rigorous action, e.g. aborting the cleaning process and/or discarding any affected milk. Hence, the monitoring of the cleaning and its effects can be made highly flexible.

According to one preferred embodiment of this aspect of the invention, the milking plant includes a data processing unit adapted to receive the valve health status signal. The data processing unit is further adapted to determine whether or not the received signal fulfills at least one test condition, and produce at least one resulting signal upon fulfillment of at least one of the at least one test condition.

According to another preferred embodiment of this aspect of the invention, the monitoring arrangement includes a pressure regulating system, which is adapted to accomplish a first fluid pressure on a milk side of the valve means exceeding a second fluid pressure in the milk line system, when the milk storage valve means are closed. The milk side of the valve means is connected to the milk storage means, either directly or via one or more other valve means. Hence, it is guaranteed that any leakage over the milk storage valve means will be directed from the milk side (i.e. towards the milk line system, where the cleaning fluid is being circulated).

According to a further preferred embodiment of this aspect of the invention, the pressure regulating system is adapted to: receive a pressurized medium; forward the pressurized medium to the milk side to develop the first fluid pressure there (exceeding the second fluid pressure in the milk line system); register any consumption of the pressurized medium after the development of the first pressure; and produce the valve health status signal in response to the consumption of the pressurized medium. Thereby, the functionality status of the milk storage valve means is indicated consistently.

According to yet other preferred embodiments of this aspect of the invention, the monitoring arrangement includes a buffer vessel adapted to store a well-defined volume of the pressurized medium. The pressure regulating system, in turn, includes a pressure sensing means and/or a flow meter. The pressure sensing means is adapted to register the first pressure in the buffer vessel, and the flow meter is adapted to register a volume of the pressurized medium received by the pressure regulating system. The monitoring arrangement is here adapted to determine the amount of leakage through the valve means during the cleaning of the milk line system based on either the registered first pressure in the buffer vessel, the received volume of the pressurized medium, or both the registered first pressure and the received volume. The latter is advantageous because it allows the pressurized medium to be compressible, while reflecting the tightness of the milk storage valve means in terms of an incompressible medium, such as milk.

According to still another preferred embodiment of this aspect of the invention, the pressure regulating system is adapted to control a supply of the pressurized medium fed into the buffer vessel in response to any variations in the registered first pressure, such that the first pressure attains a level within a predefined range. Hence, the first pressure may be kept relatively constant, and the measurement conditions are maintained uniform.

According to one preferred embodiment of this aspect of the invention, the pressurized medium is represented by compressed gas of a specified quality, for instance fulfilling relevant regulatory specifications. It is further preferable if the gas has a chemical composition, which renders the gas adapted to be separated from the milk without influencing the properties of the milk.

According to yet another preferred embodiment of this aspect of the invention, the pressurized medium is represented by milk, e.g. in fluid connection with milk contained in the milk storage means. Thereby, the tightness of the milk storage valve means can be monitored in an extremely simple and straightforward manner.

According to another preferred embodiment of this aspect of the invention, the milk storage valve means is/are adapted to trap an amount of the pressurized medium when the valve means is/are adjusted to a closed position, such that the thus trapped amount of pressurized medium constitutes a pressure barrier between the milk line system and the milk storage means. For example, the valve means may include a container arranged in a contact zone in which a valve disc contacts a valve seat in said closed position. Since the pressurized medium has a pressure level exceeding the pressure levels on both sides of the valve means, it can be guaranteed that any leakage is directed from the contact zone. Moreover, the leakage can be quantified as a consumption of the pressurized medium.

According to another aspect of the invention, the object is achieved by the initially described method, wherein during the circulation of the cleaning fluid, leakage of the cleaning fluid into the milk storage means is prevented (e.g. by a pressure level relationship between a pressurized medium and the cleaning fluid, or between the milk and the cleaning fluid), and an amount of leakage through the valve means during the cleaning of the milk line system is determined. A valve health status signal reflecting the amount of leakage is also produced. The advantages of this method, as well as the preferred embodiments thereof, are apparent from the discussion hereinabove with reference to the proposed testing arrangement.

According to a further aspect of the invention the object is achieved by a computer program loadable into the internal memory of a computer, comprising software adapted to control the above proposed method when said program is run on a computer.

According to another aspect of the invention the object is achieved by a computer readable medium, having a program recorded thereon, where the program is adapted to make a computer control the above proposed method when the program is loaded into the computer.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

FIGS. 1a, b illustrate a proposed approach to test the tightness of a valve means by using a pressurized probing medium, FIG. 2a shows a milking plant according to a first embodiment of the invention including valve means of standard type.

DESCRIPTION OF PREFERRED EMBODIMENTS OF THE INVENTION

Figure 2B:
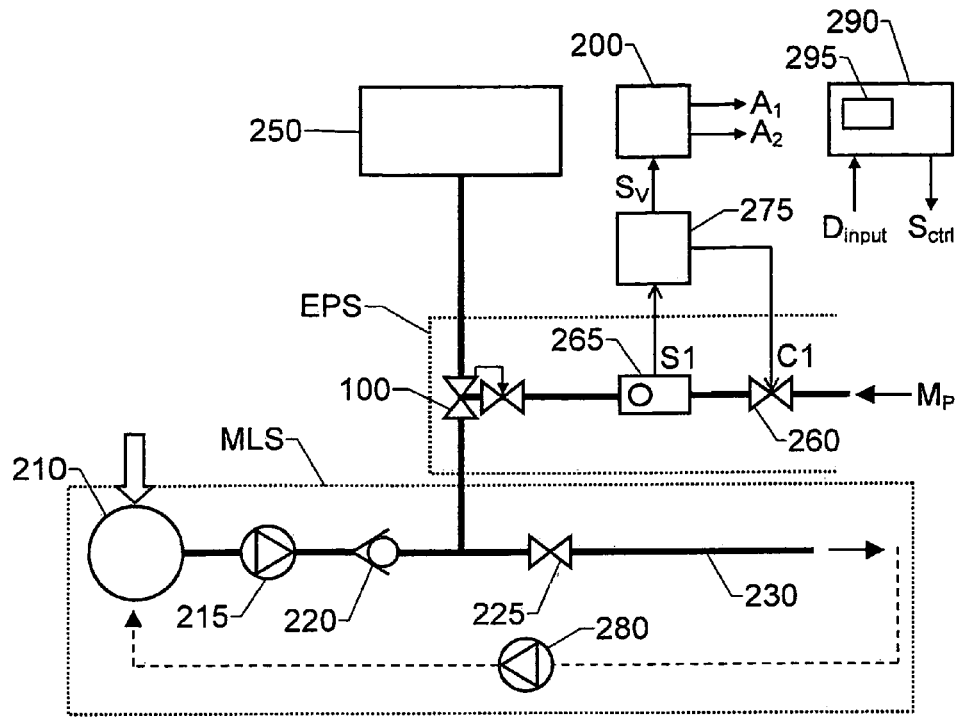
FIG. 2b shows a milking plant according to the first embodiment of the invention including valve means of the type illustrated in FIGS. 1a and 1b.

We refer initially to FIG. 1a, which shows a schematic image of a valve means 100 according to a first embodiment of the invention illustrating the principle behind a proposed qualitative tightness test of the valve means 100 that is intended to guarantee that a cleaning fluid is kept separated from a sanitary sensitive liquid, such as milk. The valve means 100 has a housing cover 120, wherein a valve disc 111 is adapted to be adjustable relative to a valve seat 121, for example along a symmetry axis of a valve spindle 110 connected to the valve disc 111, so as to either connect a first fluid volume 123 to a second fluid volume 124, or separate these volumes 123 and 124 from one another. Thus, moving the valve disc 111 in a first direction O along the symmetry axis of the valve spindle 110 opens up a passage between the first fluid volume 123 and the second fluid volume 124. Conversely, moving in the valve disc 111 in a second direction C, opposite to the first direction O, decreases this passage. When the valve means 100 is fully closed, i.e. when the valve disc 111 has been adjusted to an extreme position in the second direction C, it is desired that no fluid may pass from the first fluid volume 123 to the second fluid volume 124, or vice versa. In this positioning of the valve disc 111 any fluid passage is defined as a leak.

Naturally, in practice, the valve means 100 cannot in the long run accomplish a completely leakage-free sealing of the first fluid volume 123 from the second fluid volume 124. Therefore, it is reasonable to accept passage of smaller amounts of fluid between these volumes 123 and 124, at least in one direction, also when the valve disc 111 has been adjusted to the closed position. However, in order to determine whether the valve means 100 has an acceptable functionality status, it is highly interesting to know the magnitude of the fluid passage in the closed state. To this aim, the valve means 100 according to the invention is provided with a fluid channel 130 adapted to receive a pressurized probing medium $M_P$, and forward the medium $M_P$ to a contact zone in which the valve disc 111 contacts the valve seat 121 in the closed position. Specifically, the valve seat 121 comprises a container, e.g. in the form of a recess 122, which is connected to the fluid channel 130. Hence, a predefined amount of pressurized probing medium $M_P$ can be trapped and stored in the contact zone, i.e. between the first and second volumes 123 and 124 respectively, when the valve means 100 is closed. This is advantageous because the probing medium $M_P$ creates a pressure barrier between the first and second volumes 123 and 124 provided that the probing medium $M_P$ is supplied at an adequate pressure level, which exceeds the pressure levels of each of the first and second volumes 123 and 124. Naturally, the container for the pressurized probing medium $M_P$ may also be formed partially, or entirely, by a recess in the valve disc 111. Although being somewhat more complex from a design point-of-view, it is further conceivable that the fluid channel 130 be arranged through the valve spindle 110 and the valve disc 111 instead of through the valve seat 121.

Moreover, a milk side of the valve means 100, say connected to the first fluid volume 123, is preferably elevated to a first pressure level exceeding a second pressure level at the opposite side of the valve means 100, e.g. represented by the second fluid volume 124.

A tightness measure of the valve means 100 is attained by measuring a consumption of the pressurized probing medium $M_P$ during a period when the valve means 100 is closed. Given the above-mentioned pressure relationships any possibly consumed probing medium $M_P$ will enter into the non-milk side of the valve means, i.e. typically where cleaning fluid is being circulated. For moderate leakage levels this is normally unproblematic. However, preferably, the probing medium $M_P$ has a composition which is adapted to have minimal influence on the fluids present in either of the first and second volumes 123 and 124.

Naturally, the pressurized probing medium $M_P$ is exclusively applied after that the valve means 100 has been adjusted to its closed position. The proposed leakage measure for a valve means in a milking plant will be explained in detail below with reference to FIGS. 2a to 5b. Nevertheless, the fluid channel 130 is preferably provided with a non return valve 132 adapted to accomplish a one-way supply of the pressurized probing medium $M_P$ to the valve means 100. It is further advantageous if the fluid channel 130 has a shut off valve, which is controllable in response to the positioning of the valve disc 111, such that the pressurized Probing medium $M_P$ is only supplied when the valve means 100 is closed.

FIG. 1b shows a schematic image of a valve means 100 according to a second embodiment of the invention, wherein a valve cone 135 is included, which is adapted to achieve this function automatically. Whenever the valve means 100 is open (i.e. the valve disc 111 is separated from the valve seat 121 more than a predetermined distance), the valve cone 135 is pushed to a closed position by means of a resilient member 134, e.g. in the form of a spring. The valve cone 135 is also associated with a protruding member 136 pointing towards the valve disc 111. The protruding member 136 is arranged such that when the valve disc 111 is adjusted closer to the valve seat 121 than the predetermined distance, the valve cone 135 opens up and forwards the pressurized probing medium $M_P$ towards the valve disc 111. Here, a smaller amount of the medium $M_P$ may leak into the second volume 124. However, as soon as the valve disc 111 contacts the valve seat 121, the pressurized probing medium $M_P$ is trapped in the recess 122 to constitute the above-mentioned pressure barrier. The brief input of probing medium $M_P$ may be detected and used by a central processing unit as an indication that the valve means 100 has been closed.

It is worth pointing out that the valve means 100 shown in FIGS. 1a and 1b are merely intended to illustrate a proposed general principle to accomplish a sanitary acceptable boundary between a milk side and a side containing a medium, which should not leak over to the milk side. Theoretically, the entire volume on the milk-containing side of the milking plant could be elevated to an adequate pressure level. However, in practice, this is not an efficient strategy. Instead, for practical reasons, it is desirable that a pair of valves work together, so that a piece of pipe between them can be pressurized. The second "volume limiting" valve is of shut off type. FIGS. 2a, 3a, 4a and 5a show implementations of the invention with standard valves, whereas FIGS. 2b, 3b, 4b and 5b show implementations of the invention wherein valve means of the types illustrated in FIGS. 1a and 1b are used.

FIG. 2a shows a milking plant according to a first embodiment of the invention. The milking plant includes a primary milk collector 210, e.g. in the form of a so-called end unit, adapted to receive milk from milk collecting means attached to the teats of one or more animals. It is presumed that the milking plant includes a vacuum supply system, which is connected to the milk collecting means, and is adapted to withdraw milk from the teats. However, for reasons of a clear presentation, neither the vacuum supply system or the milk collecting means is shown in FIG. 2a. The milking plant further includes a milk line system MLS, milk storage valve means 235 and 240, a milk storage means 250 and a monitoring arrangement, which in turn includes a control module 275 and pressure regulating system EPS.

The milk line system MLS is connected to the collecting means via the primary milk collector 210, and is adapted to deliver the withdrawn milk to a milk storage means 250. According to the invention, the primary milk collector 210 is either permanently connected to the milk line system MLS, or the primary milk collector 210 is connectable to the milk line system MLS on demand (i.e. whenever milk is to be delivered to the milk storage means 250). The milk storage valve means 235 and 240 are arranged between the milk line system MLS and the milk storage means 250. At least one valve means 240 of the milk storage valve means is adapted to be selectively adjustable to prevent fluid communication between the milk line system MLS and the milk storage means 250 during cleaning of the milk line system MLS.

In the embodiment of the invention shown in FIG. 2a, the milk line system MLS includes the primary milk collector 210, a milk pump means 215, a first non-return valve 220, a first adjustable valve 225 and a dump line 230. The milk pump means 215 is connected to the primary milk collector 210, and adapted to draw milk received therein through the first non-return valve 220. This valve, in turn, is connected to an upstream side of the first adjustable valve 225 and a second non-return valve 235 included in the milk storage valve means. The downstream side of the first adjustable valve 225 is connected to the dump line 230 through which any discarded milk may be discharged.

During normal operation of the milking plant, the first adjustable valve 225 is closed, such that the milk passes from the primary milk collector 210, via the milk pump means 215, the first non-return valve 220 and through the second non-return valve 235. This valve, in turn, is further connected to an upstream side of a second adjustable valve 240 (included in the milk storage valve means) and a third non-return valve 270. The downstream side of the second adjustable valve 240 is further connected to the milk storage means 250. The third non-return valve 270 is adapted to prevent milk received via the second non-return valve 235 to enter a conduit system for receiving the pressurized probing medium $M_P$. When operating the milking plant in this milk-receiving mode, the second adjustable valve 240 is open. Thus, the milk from the second non-return valve 235 continues into the milk storage means 250.

If it is decided that the milk in the primary milk collector 210 is to be discarded, the second adjustable valve 240 is closed and the first adjustable valve 225 is opened. Consequently, the milk passes out via the dump line 230 instead of into the milk storage means 250.

Also when cleaning the milking plant, the second adjustable valve 240 is closed and the first adjustable valve 225 is opened. However, in this case, instead of receiving milk the primary milk collector 210 receives cleaning fluid. The cleaning fluid is passed via the milk pump means 215, the first non-return valve 220, the first adjustable valve 225 and the dump line 230. Preferably, the dump line 230 is connected to a cleaning fluid conduit and a return pump means 280, which is adapted to circulate the cleaning fluid back to the milk collecting means and further to the primary milk collector 210.

A milk side of the valve means 240 and 235 is defined, which is connected to the milk storage means 250. Throughout the cleaning process it is important that no cleaning fluid passes over to the milk side. Moreover, a quality measure of the valve means' 240 and 235 sealing function is desired. Therefore, according to the invention, the milk storage valve means 235 and 240 are associated with a monitoring arrangement that is represented by reference signs 275 and EPS in FIG. 2a. The monitoring arrangement is adapted to determine an amount of leakage through the milk storage valve means 235 and 240 during the cleaning of the milk line system MLS. The monitoring arrangement is also adapted to produce a valve health status signal $S_V$ that reflects the amount of leakage through the milk storage valve means 235 and 240.

According to one embodiment of the invention, the milking plant further includes a data processing unit 200, which is adapted to receive the valve health status signal $S_V$. The data processing unit 200 is adapted to determine whether or not the health status signal $S_V$ fulfills at least one test condition, and if so, the unit produces at least one resulting signal, represented by $A_1$ and $A_2$ in FIG. 2a.

Preferably, any resulting signal $A_1$ and/or $A_2$ is forwarded to a central processing unit 290, for instance as a part of a generic $D_{input}$. The central processing unit 290 is adapted to control the overall operation of the milking plant involving closing and opening the various valves 225 and 240, operating the milk pump means 215 and the return pump means 280, as well as verifying relevant statuses of these components depending on in which mode the milking plant currently is operated. For clarity reasons, no control signal lines or return data lines are shown in FIG. 2a. Instead, generic outputs $D_{input}$ and inputs $S_{ctrl}$ respectively from and to the central processing unit 290 are illustrated. The central processing unit 290 includes a computer readable medium 295 (e.g. represented by a memory module), which has a program recorded thereon, where the program is adapted to make the central processing unit 290 control the milking plant according to the proposed procedure.

According to one embodiment of the invention, the monitoring arrangement includes a pressure regulating system EPS, which is adapted to accomplish a first fluid pressure on a milk side of the valve means 235 and 240, where the first fluid pressure exceeds a second fluid pressure in the milk line system MLS when the milk storage valve means 235 and 240 are closed (i.e. do not forward any milk to the milk storage means 250).

To this aim, according to one embodiment of the invention, the pressure regulating system EPS is adapted to receive a pressurized medium $M_P$, for example in the form of a gas (e.g. air) or a liquid (e.g. milk) of predefined quality; and forward the pressurized medium $M_P$ to the milk side. Thereby, the first fluid pressure is developed, such that this pressure exceeds the second fluid pressure in the milk line system MLS. After that the first pressure $P_M$ has been developed, the pressure regulating system EPS is adapted to register any consumption of the pressurized medium $M_P$, and in response thereto produce the valve health status signal $S_V$.

For this purpose, the pressure regulating system EPS preferably includes the third non-return valve 270, a sensor means 265 and a third adjustable valve means 260. The third adjustable valve means 260 is operable in response to a control signal C1 from a control module 275. For example, the control signal C1, in turn, may be based on an initial instruction from the central processing unit 290, so that in connection with instigating the cleaning process, the third adjustable valve means 260 opens up and starts receiving the pressurized medium $M_P$ into the fluid conduits of the pressure regulating system EPS. It is generally desirable that these conduits have a relatively small and well-defined volume because thereby a stable first pressure can be developed comparatively quickly.

The sensor means 265 is connected between the third adjustable valve means 260 and the third non-return valve 270. As mentioned above, the third non-return valve 270 is adapted to prevent milk from entering the fluid conduits of the pressure regulating system EPS during milking. However, the valve 270 is adapted to allow the pressurized medium $M_P$ to reach the milk storage valve means 235 and 240, and thus develop the first pressure when cleaning fluid is present in the milk line system MLS. If at least one of the valve means 235 and 240 leaks, this will result in that an amount of the pressurized medium $M_P$ leaves the pressure regulating system EPS. The sensor means 265 is adapted to register any consumption of the pressurized medium $M_P$, and report this to the control module 275 by means of a signal S1. Hence, the sensor means 265 may include a flow meter. Furthermore, the control module 275 may be adapted to maintain the first pressure: (i) at an essentially constant level, (ii) at a level exceeding the second pressure by a predefined amount, or (iii) at a level having a predefined relationship to the second pressure.

FIG. 2b shows a milking plant analogous to the above-described first embodiment of the invention, however where a valve means 100 of the type illustrated in FIG. 1a or FIG. 1b is included. As can be seen, the valve means 100 replaces the milk storage valve means 235 and 240 and the third non-return valve 270, and thus simplifies the design to some extent compared to the embodiment of FIG. 2*a*. Otherwise, all units and signals being associated with reference symbols which also occur in FIG. 2*a* are identical to the above-described units and signals bearing these reference symbols.

Figure 3A:
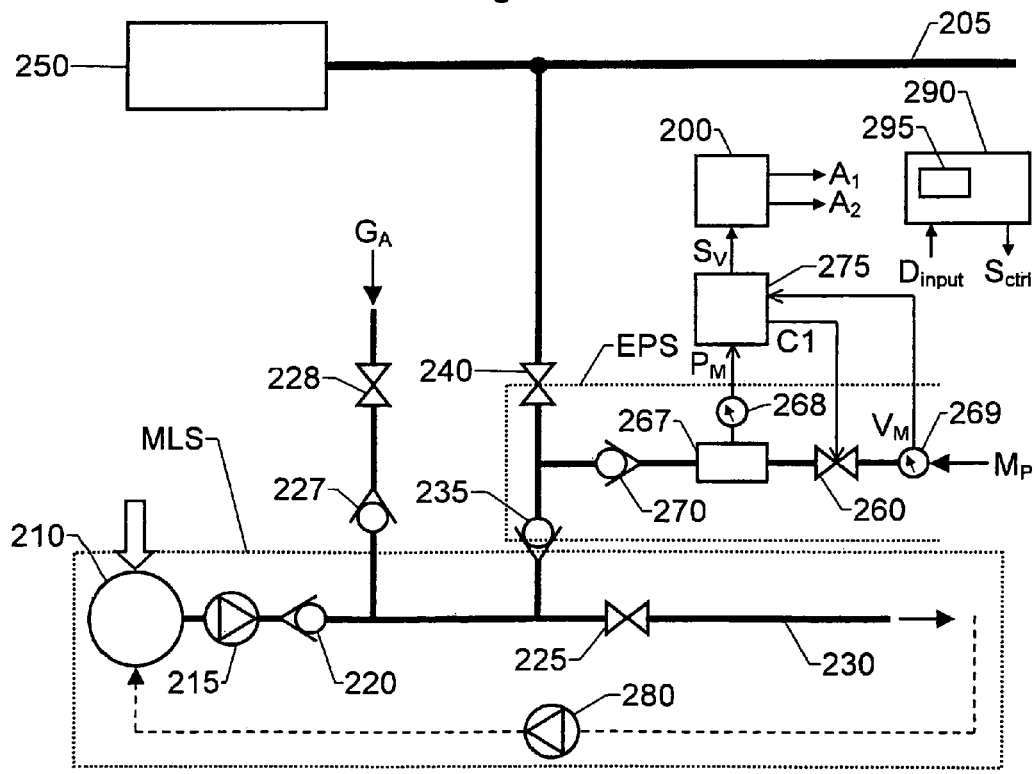
FIG. 3a shows a milking plant according to a second embodiment of the invention including valve means of standard type.

FIG. 3*a* shows a milking plant according to a second embodiment of the invention. Here, any units and signals that are associated with reference symbols which also occur in FIGS. 2*a* and 2*b* are identical to the above-described units and signals bearing these reference symbols. In the embodiment shown in FIG. 3*a*, the milk storage means 250 may be shared with one or more other milking plants, so that the milk storage means 250 receives milk from more than one milk line system MLS. This is schematically symbolized by means of a collective milk conduit 205.

The milk line system MLS is connected to a gas conduit adapted to receive an assisting gas flow $G_A$. The gas conduit attaches to the milk line system MLS between the first non-return valve 220 and the first adjustable valve 225, and provides the assisting gas flow $G_A$ via a fourth non-return valve 227, at a magnitude determined by a fourth adjustable valve 228. In connection with emptying the milk line system MLS and/or circulating cleaning fluid there through, it is preferable to pass the assisting gas flow $G_A$ into the milk line system MLS to speed up the emptying process respective speed up the cleaning process and enhance the efficiency thereof. It is further preferable if the assisting gas flow $G_A$ is pulsated; i.e. if its intensity varies repeatedly. Nevertheless, the pressure of the assisting gas flow $G_A$ is always lower than the first pressure $P_M$ of the pressurized medium $M_P$. Analogous to what was described above, the fourth adjustable valve 228 is preferably controlled by the central processing unit 290 based on the signals transmitted via the generic outputs and inputs $S_{ctrl}$ and $D_{input}$.

The monitoring arrangement here includes a buffer vessel 267 adapted to store a well-defined volume of the pressurized medium $M_P$. A pressure sensing means 268 is specifically adapted to register the first pressure $P_M$ in the buffer vessel 267. The monitoring arrangement also includes a flow meter 269 adapted to register a volume $V_M$ of the pressurized medium $M_P$ that is received by the pressure regulating system EPS. The control module 275 of the monitoring arrangement is adapted to receive signals reflecting the first pressure $P_M$ and the volume $V_M$, and based thereon determine the amount of leakage through the valve means 235 and 240 during the cleaning of the milk line system MLS. As a further result, the control module 275 is adapted to produce a corresponding health status signal $S_V$. The registering of both the first pressure $P_M$ and the volume $V_M$ renders it possible to use a pressurized medium $M_P$ that has different compression properties than the milk and/or the cleaning fluid, and still draw conclusions regarding the tightness of the milk storage valve means 235 and 240 with respect to milk and/or the cleaning fluid. For instance, the pressurized medium $M_P$ can be compressed gas of a specified quality fulfilling relevant regulatory specifications. It is further preferable if this gas has a chemical composition which renders the gas adapted to be separated from the milk without influencing the properties of the milk. Consequently, the gas may be cleaned air.

According to one embodiment of the invention, the pressure regulating system EPS is adapted to control an amount of the pressurized medium $M_P$ being fed into the buffer vessel 267 in response to any variations in the registered first pressure $P_M$, such that the first pressure $P_M$ attains a level within a predefined range. Hence, the control module 275 may be adapted to open the third adjustable valve means 260 when the first pressure $P_M$ falls below a threshold level.

Figure 3B:
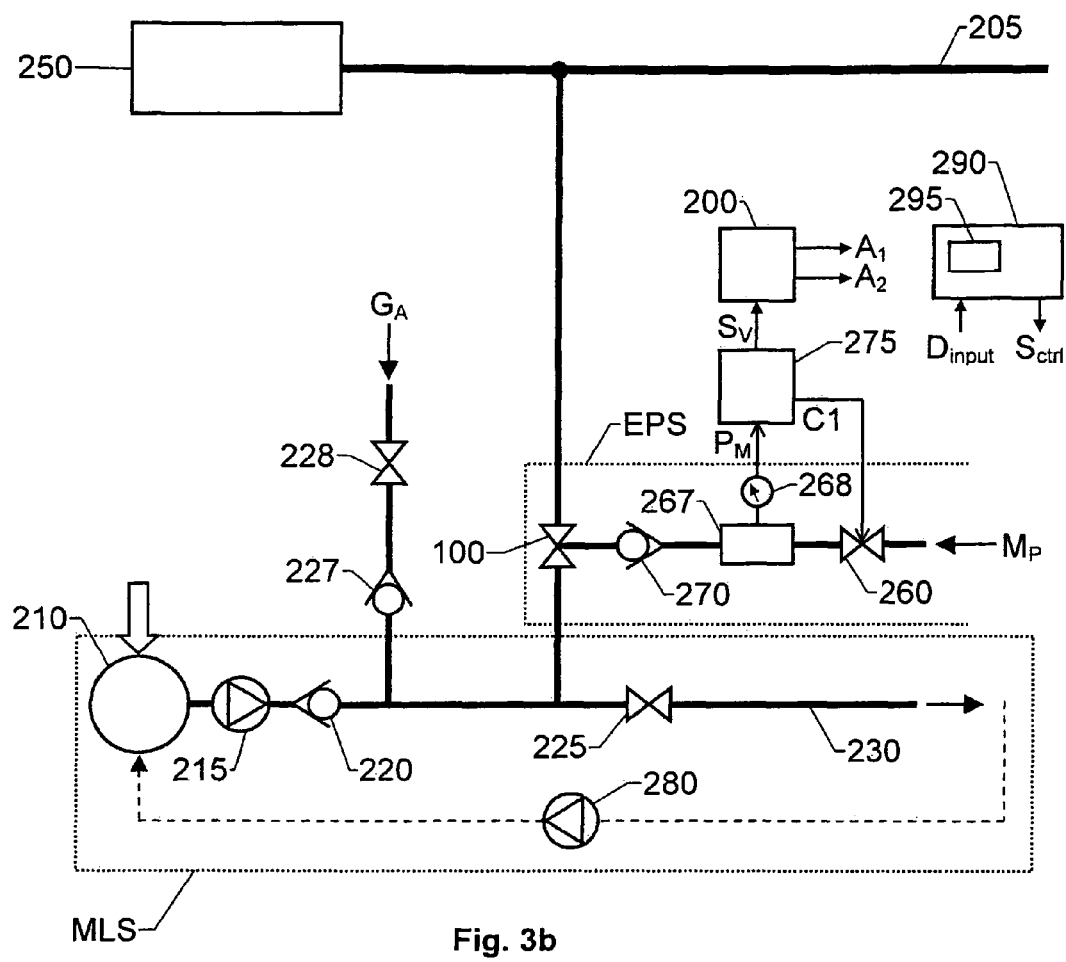
FIG. 3b shows a milking plant according to the second embodiment of the invention including valve means of the type illustrated in FIGS. 1a and 1b.

FIG. 3*b* shows a milking plant analogous to the above-described second embodiment of the invention, however where a valve means 100 of the type illustrated in FIG. 1*a* or FIG. 1*b* is included. As can be seen, the valve means 100 replaces the milk storage valve means 235 and 240, and thus simplifies the design to some extent compared to the embodiment of FIG. 3*a*. Otherwise, all units and signals being associated with reference symbols which also occur in FIG. 3*a* are identical to the above-described units and signals bearing these reference symbols. Thus, the pressure sensing means 268 is adapted to register the first pressure $P_M$ in the buffer vessel 267, and the control module 275 is adapted to replace any pressurized medium $M_P$ that leaks through the valve means 100 via the third adjustable valve means 260 in response to the control signal C1. Here, a number of fillings up to a predefined first pressure level $P_M$ constitutes a basis for the health status signal $S_V$.

Figure 4A:
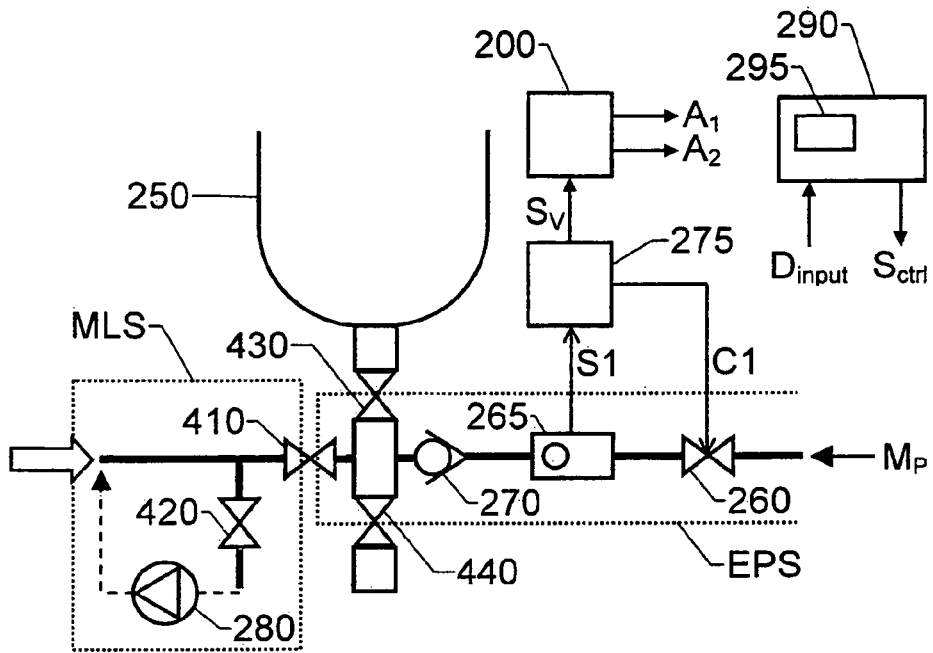
FIG. 4a shows a milking plant according to a third embodiment of the invention including valve means of standard type.

FIG. 4*a* shows a milking plant according to a third embodiment of the invention. Again, any units and signals being associated with reference symbols which also occur in FIG. 2*a*, 2*b*, 3*a* or 3*b* are identical to the above-described units and signals bearing these reference symbols. Here, the milk line system MLS is connected to a milk storage means 250 in the form of a so-called farm tank.

A fifth adjustable valve 410 connects the milk line system MLS to the pressure regulating system EPS. A sixth adjustable valve 420 upstream to the fifth adjustable valve 410 is adapted to enable discarding of milk that should not continue into the milk storage means 250. However, during normal milking the sixth adjustable valve 420 is closed and the fifth adjustable valve 410 is open.

Moreover, the pressure regulating system EPS includes a seventh and an eighth adjustable valve 430 and 440 respectively. Both these valves are connected to a downstream side of the fifth adjustable valve 410. The seventh adjustable valve 430, in turn, separates the milk storage means 250 from the pressure regulating system EPS, and the eighth adjustable valve 440 provides a passage for emptying the milk storage means 250. Hence, during normal milking, the seventh adjustable valve 430 is open and the eighth adjustable valve 440 is closed.

When cleaning the milk line system MLS, the fifth, seventh and eighth adjustable valves 410, 430 and 440 are all closed. However, the sixth adjustable valve 420 is open. Preferably, a return pump 280 and appropriate conduits are attached between the sixth adjustable valve 420 and an inlet to the milk line system MLS, such that cleaning fluid may be circulated efficiently through the milk line system MLS. During this period, the third adjustable valve 260 allows the pressurized medium $M_P$ into the pressure regulating system EPS, and the monitoring arrangement produces the valve health status signal $S_V$ reflecting any leakage through the valve means 410, 430 and 440 according to what has been described above with reference to FIGS. 2*a* to 3*b*.

Figure 4B:
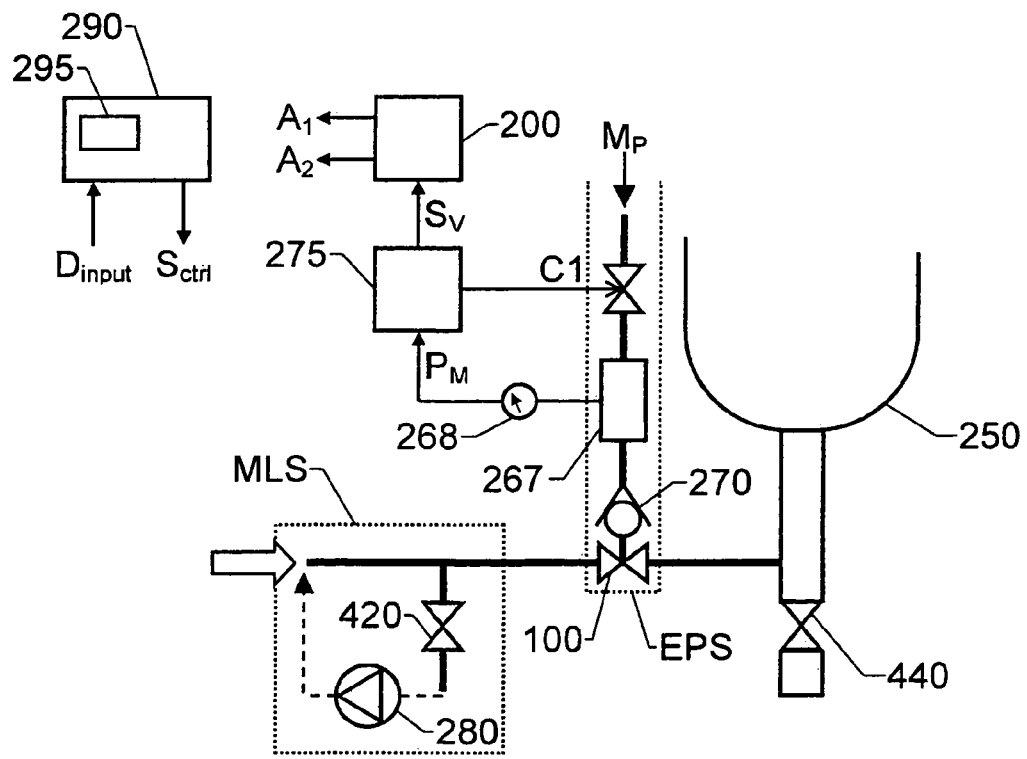
FIG. 4b shows a milking plant according to the third embodiment of the invention including valve means of the type illustrated in FIGS. 1a and 1b.

FIG. 4*b* shows a milking plant analogous to the above-described third embodiment of the invention, however where a valve means 100 of the type illustrated in FIG. 1*a* or FIG. 1*b* is included. As can be seen, the valve means 100 replaces the fifth adjustable valve 410 and the seventh adjustable valve 430, and thus simplifies the design to some extent compared to the embodiment of FIG. 4*a*. The pressurized probing medium $M_P$ trapped in the contact zone of the valve means 100 when this valve means is closed prevents cleaning fluids from reaching the milk in the milk storage means 250 when the milk line system MLS is subjected to cleaning. However, said trapped pressurized probing medium $M_P$ likewise prevents cleaning fluids from reaching any milk in the milk line system MLS when the milk storage means 250 is being cleaned.

All units and signals in FIG. 4b that are associated with reference symbols which also occur in FIG. 4a are identical to the above-described units and signals bearing these reference symbols. Nevertheless, a pressure sensing means 268 is also included in the embodiment shown in FIG. 4b. The pressure sensing means 268 is adapted to operate in conjunction with the buffer vessel 267, and the control module 275 as described above with reference to FIG. 3b.

Figure 5A:
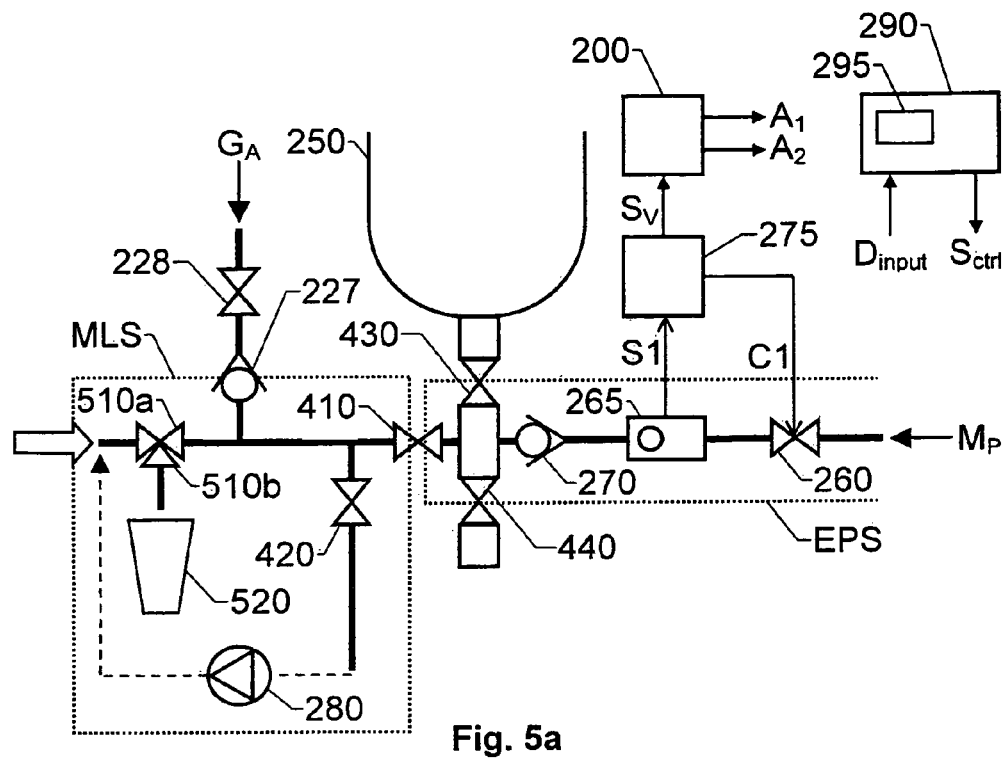
FIG. 5a shows a milking plant according to a fourth embodiment of the invention including valve means of standard type.

FIG. 5a shows a milking plant according to a fourth embodiment of the invention. Also in this case, any units and signals being associated with reference symbols which also occur in FIGS. 2a, 2b, 3a, 3b, 4a or 4b are identical to the above-described units and signals bearing these reference symbols, and the milk storage means 250 is represented by a farm tank.

During normal milking, milk enters via a three-port adjustable valve, which has two downstream outlets 510a and 510b respectively, wherein a first outlet 510a forwards the milk to the fifth adjustable valve 410. Thereafter, the milk continues into the milk storage means 250 as described above. A second outlet 510b of the three-port adjustable valve is closed.

When cleaning the milk line system MLS, the first outlet 510a is open, the second outlet 510b is closed, the fifth adjustable valve 410 is closed and the sixth adjustable valve 420 is open. Preferably, a return pump 280 and appropriate conduits are attached between the sixth adjustable valve 420 and an inlet to the milk line system MLS, such that cleaning fluid may be circulated efficiently through the milk line system MLS. During this period, the third adjustable valve 260 allows the pressurized medium $M_P$ into the pressure regulating system EPS, and the monitoring arrangement produces the valve health status signal $S_V$ reflecting any leakage through the valve means 410, 430 and 440 according to what has been described above with reference to FIGS. 2a to 4b.

The embodiment of the invention shown in FIG. 5a also allows milking to continue when cleaning the milk storage means 250. Here, the first outlet 510a of the three-port valve is closed, and the second outlet 510b is open, such that the milk is diverted into an alternative storage tank 520. During this period, the fourth adjustable valve 228 is open to allow the assisting gas flow $G_A$ into the milk line system MLS, and the fifth and sixth adjustable valves 410 and 420 are closed. Hence, an elevated pressure is developed in the milk line system MLS. Furthermore, the third adjustable valve 260 is closed, such that the pressure regulating system EPS is free from pressurized medium $M_P$. Instead, the seventh and eighth adjustable valves 430 and 440 are open, and cleaning fluids are passed there through from the milk storage means 250. Consequently, the milking plant can be operated in a very efficient manner.

FIG. 5a shows the assisting gas flow $G_A$ and the pressurized medium $M_P$ as separate fluid inputs to the milking plant. However, for example if the pressurized medium $M_P$ is represented by a gas (e.g. air of sanitary quality), the assisting gas flow $G_A$ may be obtained from the same source as the pressurized medium $M_P$.

Figure 5B:
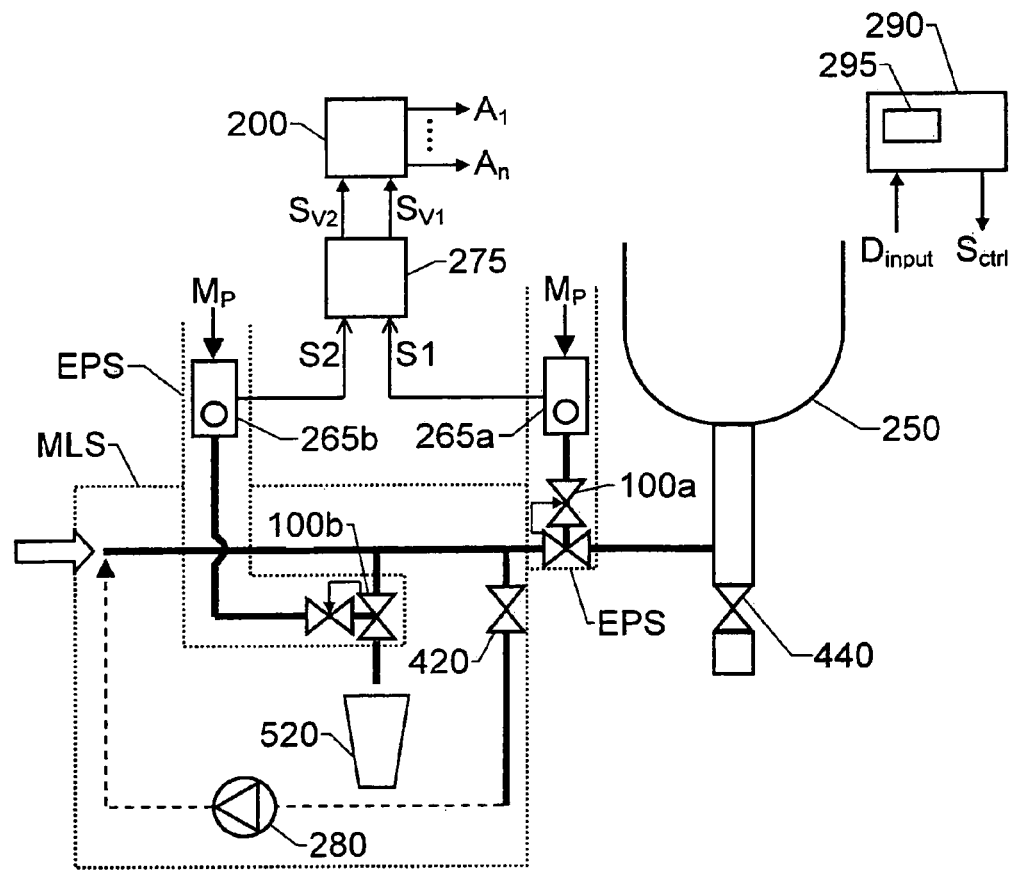
FIG. 5b shows a milking plant according to the fourth embodiment of the invention including valve means of the type illustrated in FIGS. 1a and 1b.

FIG. 5b shows a milking plant analogous to the above-described fourth embodiment of the invention, however where two valve means 100a and 100b respectively of the type illustrated in FIG. 1a or FIG. 1b are included. Here, a first valve means 100a replaces the third non-return valve 270, fifth adjustable valve 410 and seventh adjustable valve 430 relative to the embodiment shown in FIG. 5a, while a second valve means 100b replaces the fourth adjustable valve 228, the fourth non-return valve 227 and the outlets 510a and 510b of the three-port valve.

As a result, pressurized probing medium $M_P$ trapped in the contact zone of the first valve means 100a when this valve means is closed, on one hand, prevents cleaning fluids passed through the milk line system MLS and/or the alternative storage tank 520 from reaching the milk in the milk storage means 250; and on the other hand, prevents cleaning fluids passed through the milk storage means 250 from reaching any milk in the milk line system MLS. Similarly, pressurized probing medium $M_P$ trapped in the contact zone of the second valve means 100b when this valve means is closed prevents cleaning fluids circulated through the milk line system MLS from reaching the alternative storage tank 520.

In analogy to what has been described above, a first sensor means 265a is adapted to register a first signal S1 indicative of a consumption of pressurized probing medium $M_P$ in the first valve means 100a, and a second sensor means 265b is adapted to register a second signal S2 indicative of a consumption of pressurized probing medium $M_P$ in the second valve means 100b. Furthermore, the control module 275 is adapted to produce a respective corresponding health status signal $S_{V1}$ and $S_{V2}$ based upon which the data processing unit 200 is adapted to determine whether or not at least one test condition is fulfilled. If so, the unit 200 is adapted to produce at least one resulting signal represented by $A_1, \ldots, A_n$.

Figure 6:
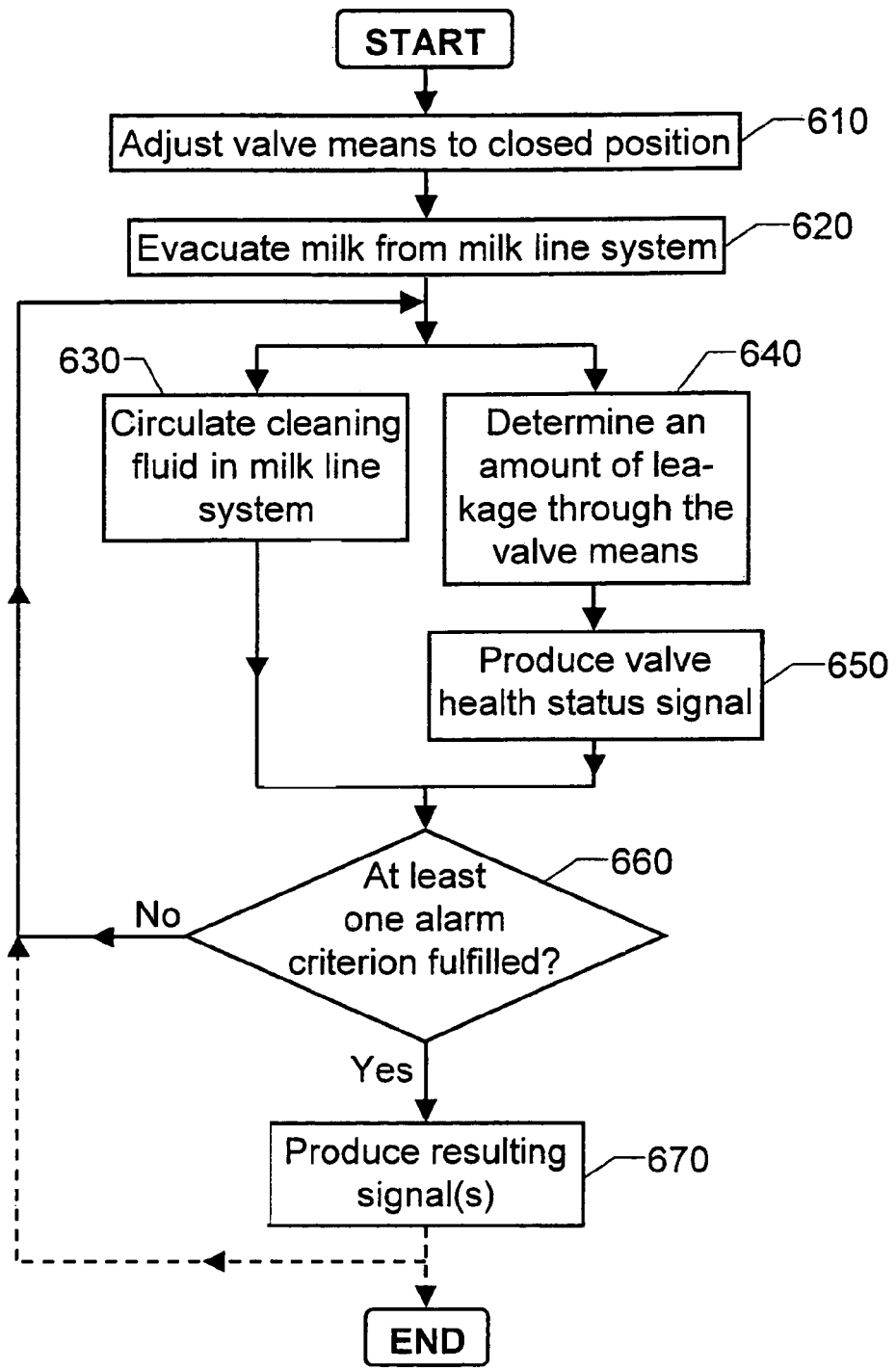
FIG. 6 illustrates, by means of a flow diagram, the general method of controlling a computer apparatus to perform the proposed cleaning procedure according to the invention and a preferred embodiment thereof.

In order to sum up, we will now describe the proposed method of controlling a computer apparatus to clean the milk line system of a milking plant with reference to the flow diagram in FIG. 6. The flow diagram of FIG. 6 also illustrates one preferred embodiment of the method according to the invention.

A first step 610 adjusts the milk storage valve means that separate the milk line system from a milk-containing storage means to a closed position. When relevant status signals have been received confirming that the milk storage valve means are closed, a step 620 follows. This step evacuates any milk in the milk line system of the milking plant. Preferably, this involves applying a pressurized gas to the milk line system. Subsequently steps 630 and 640 follow. Step 630 circulates at least one cleaning fluid in the milk line system. At the same time, the milk storage means contains milk which shall be protected from this cleaning fluid.

In parallel with step 630, a step 640 determines an amount of leakage through the milk storage valve means, for example by studying a consumption of a pressurized medium applied to the valve means. A step 650, subsequent to step 640 and parallel to step 630, produces a valve health status signal reflecting the amount of leakage through the valve means. Thereafter, the procedure may either end, or loop back to steps 630 and 640.

However, according to one preferred embodiment of the invention, a step 660 follows after step 650. Step 660 investigates whether or not the valve health status signal fulfills at least one test condition. If at least one test condition is found to be fulfilled, a step 670 follows. Otherwise, the procedure loops back to steps 630 and 640. Step 670 produces at least one resulting signal, whose characteristics preferably depends on the amount of leakage reflected by the valve health status signal. After step 670 the procedure either ends or loops back to steps 630 and 640. For example, if a resulting signal in step 660 indicates a relatively insignificant alarm condition, the procedure may loop back to steps 630 and 640. However, if a resulting signal in step 670 indicates a relatively severe alarm condition, the procedure may end. Preferably, appropriate corrective actions are performed instead.

It should be mentioned that the above evacuating step 620 preferably involves a leakage testing procedure analogous to steps 630 through 660 wherein the tightness of the milk storage valve means are tested. Namely, also during this phase it is key that the milk in the milk storage means be protected from foreign substances.

All of the process steps, as well as any sub-sequence of steps, described with reference to FIG. 6 above may be controlled by means of a programmed computer apparatus. Moreover, although, the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention primarily is intended to be utilized in connection with cow milking, the invention is equally well adapted for testing milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia, or any other country.

The invention is not restricted to the described embodiments in the figures, but may be varied freely within the scope of the claims.

The invention claimed is:

1. A milking plant with a milk monitoring system, comprising:
   a milk collecting device attachable to teats of the animals,
   a vacuum supply system, connected to the milk collecting device, and adapted to withdraw milk from the teats;
   a milk line system (MLS), connectable to the milk collecting device, and adapted to deliver the withdrawn milk to a milk storage device, and
   a pressure barrier between the milk line system (MLS) and the milk storage device, the pressure barrier comprising a milk storage valve arranged between the milk line system (MLS) and the milk storage device, the milk storage valve being selectively adjustable to prevent fluid communication between the milk line system (MLS) and the milk storage device during cleaning of the milk line system (MLS); and
   a milk monitoring system to determine an amount of leakage through the milk storage valve during cleaning of the milk line system (MLS), the milk monitoring system comprising a monitoring device to produce a valve health status signal ($S_V$) reflecting the amount of leakage through the milk storage valve.

2. The milking plant of claim 1,
   wherein the milk storage valve is selectively adjustable to prevent fluid communication between the milk line system (MLS) and the milk storage device during cleaning of the milk line system (MLS), and
   wherein the milk storage valve is adapted to trap an amount of pressurized medium ($M_P$) when adjusted to a closed position, such that the trapped amount of pressurized medium ($M_P$) constitutes the pressure barrier between the milk line system (MLS) and the milk storage device.

3. The milking plant according to claim 2, further comprising a data processing unit adapted to receive the valve health status signal (Sv), determine whether or not the signal ($S_V$) fulfills at least one test condition, and produce at least one resulting signal ($A_1, A_2$) upon fulfillment of at least one of the at least one test condition.

4. The milking plant according to claim 1, wherein the monitoring system further comprises a pressure regulating system (EPS),:
   a buffer vessel adapted to store a well-defined volume of the pressurized medium ($M_P$) and the pressure regulating system, and
   a flow meter adapted to register a volume ($V_M$) of the pressurized medium ($M_P$) received by the pressure regulating system (EPS),
   wherein the monitoring arrangement is adapted to determine the amount of leakage through the milk storage valve during the cleaning of the milk line system (MLS) based on the received volume ($V_M$) of the pressurized medium ($M_P$).

5. The milking plant according to claim 1, wherein the monitoring system further comprises:
   a buffer vessel adapted to store a well-defined volume of the pressurized medium ($M_P$) and the pressure regulating system, and
   a pressure sensing device adapted to register a first pressure ($P_M$) in the buffer vessel, and
   wherein the monitoring system is adapted to determine the amount of leakage through the milk storage valve during the cleaning of the milk line system (MLS) based on the registered first pressure ($P_M$) in the buffer vessel.

6. The milking plant according to claim 5, wherein a pressure regulating system (EPS) is adapted to control a supply of the pressurized medium ($M_P$) fed into the buffer vessel in response to any variations in the registered first pressure ($P_M$), such that the registered first pressure ($P_M$) attains a level within a predefined range.

7. The milking plant according to claim 2, wherein the monitoring system includes a pressure regulating system (EPS) adapted to accomplish a first fluid pressure (Pm) on a milk side of the milk storage valve, and the milk side of the milk storage valve being connected to the milk storage device.

8. The milking plant according to claim 7, wherein the pressure regulating system (EPS) is adapted to:
   receive the pressurized medium ($M_P$),
   forward the pressurized medium ($M_P$) to the milk side to develop the first fluid pressure,
   register any consumption of the pressurized medium ($M_P$) after the development of the first pressure ($P_M$), and
   generate the valve health status signal ($S_V$) in response to the consumption of the pressurized medium ($M_P$).

9. The milking plant according to claim 7, wherein the first fluid pressure exceeds a second fluid pressure in the milk line system (MLS) when the milk storage valve is closed.

10. The milking plant according to claim 2, wherein the pressurized medium ($M_P$) is represented by compressed gas of a specified quality.

11. The milking plant according to claim 10, wherein the compressed gas has a chemical composition which renders the compressed gas adapted to be separated from the milk without influencing properties of the milk.

12. The milking plant according to claim 2, wherein the pressurized medium ($M_P$) is represented by milk.

13. The milking plant according to claim 2, wherein the milk storage valve comprises a container adapted to trap a predetermined amount of the pressurized medium ($M_P$) when the milk storage valve is adjusted to the closed position, the container being arranged in a contact zone in which a valve disc that contacts a valve seat in said closed position.

14. The milking plant of claim 1,
   wherein the milk monitoring system is connected to the milk storage valve, and
   wherein the milk storage valve is adapted to trap an amount of pressurized medium ($M_P$) when adjusted to a closed position, such that the trapped amount of pressurized medium ($M_P$) constitutes the pressure barrier between the milk line system (MLS) and the milk storage device.

15. The milking plant according to claim 14, wherein the milk monitoring system includes a pressure regulating system adapted to accomplish a first fluid pressure on a milk side of the milk storage valve.

16. The milking plant according to claim 14, further comprising a data processing unit adapted to receive the valve health status signal ($S_V$), determine whether or not the signal ($S_V$) fulfills at least one test condition, and produce at least one resulting signal ($A_1, A_2$) upon fulfillment of at least one of the at least one test condition.

17. The milking plant according to claim 1, further comprising:
   a pressure regulating system adapted to accomplish a first fluid pressure (Pm) on a milk side of the milk storage valve,
   wherein the pressure regulating system is adapted to:
   receive a pressurized medium ($M_P$),
   forward the pressurized medium ($M_P$) to the milk side to develop the first fluid pressure which exceeds the second fluid pressure,
   register any consumption of the pressurized medium ($M_P$) after the development of the first pressure ($P_M$), and
   generate the valve health status signal ($S_V$) in response to the consumption of the pressurized medium ($M_P$).

18. The milking plant according to claim 17, further comprises a buffer vessel adapted to store a well-defined volume of the pressurized medium ($M_P$) and the pressure regulating system and adapted to determine the amount of leakage through the milk storage valve during the cleaning of the milk line system (MLS) based on the received volume ($V_M$) of the pressurized medium ($M_P$).

19. The milking plant according to claim 18, further comprising a pressure sensing device adapted to register the first pressure ($P_M$) in the buffer vessel and adapted to determine the amount of leakage through the valve during the cleaning of the milk line system (MLS) based on the registered first pressure ($P_M$) in the buffer vessel.

20. The milking plant according to claim 19, wherein the pressure regulating system is adapted to control a supply of the pressurized medium ($M_P$) fed into the buffer vessel in response to any variations in the registered first pressure ($P_M$), such that the first pressure ($P_M$) attains a level within a predefined range.

21. The milking plant according to claim 1, wherein the pressurized medium ($M_P$) is represented by compressed gas.

22. The milking plant according to claim 21, wherein the compressed gas has a chemical composition which renders the compressed gas adapted to be separated from the milk without influencing properties of the milk.

23. The milking plant according to claim 1, wherein the pressurized medium ($M_P$) is represented by milk.

24. The milking plant according to of claim 1,
   wherein the milk storage valve comprises:
   i) a valve disc adapted to be adjustable relative to a valve seat, and
   ii) a fluid channel adapted to receive a pressurized probing medium (Mp), and forward the probing medium (Mp) to a contact zone in which the valve disc contacts the valve seat in a closed position, and
   iii) a container connected to the fluid channel.

25. The milking plant according to claim 24, wherein, with the milk storage valve in the closed position, a predefined amount of pressurized probing medium (Mp) is trapped and stored in the contact zone, a consumption of the pressurized probing medium (Mp) indicating a tightness of the valve disc relative to the valve seat.

26. The milking plant according to claim 25, wherein the container is a recess in the valve seat.

27. The milking plant to claim 24, wherein the fluid channel is provided with a non-return valve.

28. The milking plant according to claim 24, wherein the milk storage valve further comprises:
   a valve cone configured to forward the probing medium (Mp) towards the valve disc; and
   a resilient member for pushing the valve cone to a closed position.

29. The milking plant according to claim 28, wherein the valve cone includes a protruding member pointing towards the valve disc, and adapted to be arranged such that when the valve disc is adjusted closer to the valve seat than a predetermined distance, the valve cone opens up and forwards the pressurizing probing medium (Mp) towards the valve disc.

30. The milking plant according to claim 28, wherein the resilient member is a spring.

31. A milk monitoring system for a milking plant comprising a milk collecting device attachable to teats of the animals; a vacuum supply system, connected to the milk collecting device, and adapted to withdraw milk from the teats; a milk line system (MLS), connectable to the milk collecting device, and adapted to deliver the withdrawn milk to a milk storage device, the milk monitoring system comprising:
   a pressure barrier between the milk line system (MLS) and the milk storage device, the pressure barrier comprising a milk storage valve arranged between the milk line system (MLS) and the milk storage device, the milk storage valve being selectively adjustable to prevent fluid communication between the milk line system (MLS) and the milk storage device during cleaning of the milk line system (MLS); and a milk monitoring system to determine an amount of leakage through the milk storage valve during cleaning of the milk line system (MLS), the milk monitoring system comprising a monitoring device to produce a valve health status signal ($S_V$) reflecting the amount of leakage through the milk storage valve.

32. A method of cleaning a milking plant including a milk collecting device attachable to teats of animals to be milked; a vacuum supply system, connected to the milk collecting device, and adapted to withdraw milk from the teats; a milk line system (MLS), connectable to the collecting device, and adapted to deliver the withdrawn milk to a milk storage device; and a milk storage valve, arranged between the milk line system (MLS) and the milk storage device, the milk storage valve being selectively adjustable to a closed position in which fluid communication between the milk line system (MLS) the milk storage device is prevented, and a milk monitoring system operable to determine an amount of leakage through the milk storage valve during cleaning of a milk line system (MLS), the milk monitoring system comprising a monitoring device to produce a valve health status signal ($S_V$) reflecting the amount of leakage through the milk storage valve, the method comprising:

adjusting the milk storage valve to the closed position, and thereafter circulating a cleaning fluid in the milk line system (MLS) while the milk storage device contains milk, wherein the milk storage valve is adapted to trap an amount of pressurized medium ($M_P$) when adjusted to the closed position, such that the trapped amount of pressurized medium ($M_P$) constitute a pressure barrier between the milk line system (MLS) and the milk storage device, and during the circulation of the cleaning fluid:

determining an amount of leakage through the milk storage valve during the cleaning of the milk line system (MLS), and producing the valve health status signal ($S_V$) reflecting the amount of leakage through the milk storage valve.

33. The method according to claim 32, comprising:
determining in a data processing unit whether or not the valve health status signal ($S_V$) fulfills at least one test condition, and
generating at least one resulting signal ($A_1$, $A_2$) in the data processing unit if at least one of the at least one test condition is fulfilled.

34. The method according to claim 32, further comprising:
accomplishing, by a pressure regulating system (EPS), a first fluid pressure (Pm) on a milk side of the milk storage valve, the milk side of the milk storage valve being connected to the milk storage device.

35. The method according to claim 34, comprising:
receiving the pressurized medium in the pressure regulating system,
forwarding the pressurized medium to the milk side to develop the first fluid pressure,
registering any consumption of the pressurized medium after the development of the first pressure ($P_M$), and
generating the valve health status signal ($S_V$) in response to the consumption of the pressurized medium.

36. The method according to claim 34, wherein the first fluid pressure exceeds a second fluid pressure in the milk line system (MLS) when the milk storage valve is closed.

37. The method according to claim 32, further comprising:
registering a volume ($V_M$) of the pressurized medium received in a pressure regulating system by a flow meter, and
determining in the monitoring system the amount of leakage through the milk storage valve during the cleaning of the milk line system (MLS) based on the received volume ($V_M$) of the pressurized medium ($M_P$),
wherein the monitoring system includes a buffer vessel adapted to store a well-defined volume of the pressurized medium ($M_P$).

38. The method according to claim 32, further comprising:
registering a first pressure ($P_M$) in a buffer vessel by means of a pressure sensing device, and
determining in the monitoring system the amount of leakage through the milk storage valve during the cleaning of the milk line system (MLS) based on the registered first pressure ($P_M$) in the buffer vessel,
wherein the monitoring system includes the buffer vessel adapted to store a well-defined volume of the pressurized medium ($M_P$).

39. The method according to claim 38, further comprising controlling in a pressure regulating system (EPS), a supply of the pressurized medium ($M_P$) fed into the buffer vessel in response to any variations in the registered first pressure ($P_M$), such that the registered first pressure ($P_M$) attains a level within a predefined range.

40. A computer readable, non-transitory medium, having a program recorded thereon, where the program when executed on a computer, controls the computer to execute the method of claim 32.

* * * * *